United States Patent [19]

Freeland et al.

[11] Patent Number: 4,752,329
[45] Date of Patent: Jun. 21, 1988

[54] APPARATUS AND METHOD FOR INCREASING CARBON CONTENT OF HOT DIRECTLY REDUCED IRON

[75] Inventors: Michael N. Freeland, Matthews; Gregory D. Hughes, Mint Hill, both of N.C.

[73] Assignee: Midrex International B.V. Rotterdam, Zurich Branch, Zurich, Switzerland

[21] Appl. No.: 842,514

[22] Filed: Mar. 21, 1986

[51] Int. Cl.$^4$ .......................... C21B 13/02; F27B 1/26
[52] U.S. Cl. .......................................... 75/35; 266/80; 266/82
[58] Field of Search ................... 75/34, 35; 266/80, 82

[56] References Cited

U.S. PATENT DOCUMENTS

| | | | |
|---|---|---|---|
| 4,054,444 | 10/1977 | Clark et al. | 75/35 |
| 4,224,057 | 9/1980 | Martinez-Vera et al. | 75/35 |
| 4,348,226 | 9/1982 | Aoki et al. | 266/156 |

*Primary Examiner*—Melvyn J. Andrews
*Attorney, Agent, or Firm*—Ralph H. Dougherty

[57] ABSTRACT

A method of producing a hot, carburized metallized iron product in a generally vertical shaft furnace having an upper reducing zone in which iron oxide reacts with a gaseous reductant, and a lower carbon control and product discharge zone, including: establishing a gravitationally descending iron oxide burden in the furnace; reacting hot gaseous gaseous reductant with the descending burden to form a metallized iron product and a reacted top gas; and injecting a hydrocarbon gas mixture consisting of hot reformed reducing gas and cool natural gas to the product discharge section of the shaft furnace; whereby the carbon content of the metallized iron pellet product is controlled by mixing the reformed gas and natural gas in the proper ratio to balance the endothermic and exothermic reactions within the discharge zone of the furnace. Apparatus for carrying out the method includes means for controlling the respective amounts of gas introduced to the product discharge zone from the reformer and the source of natural gas.

12 Claims, 1 Drawing Sheet

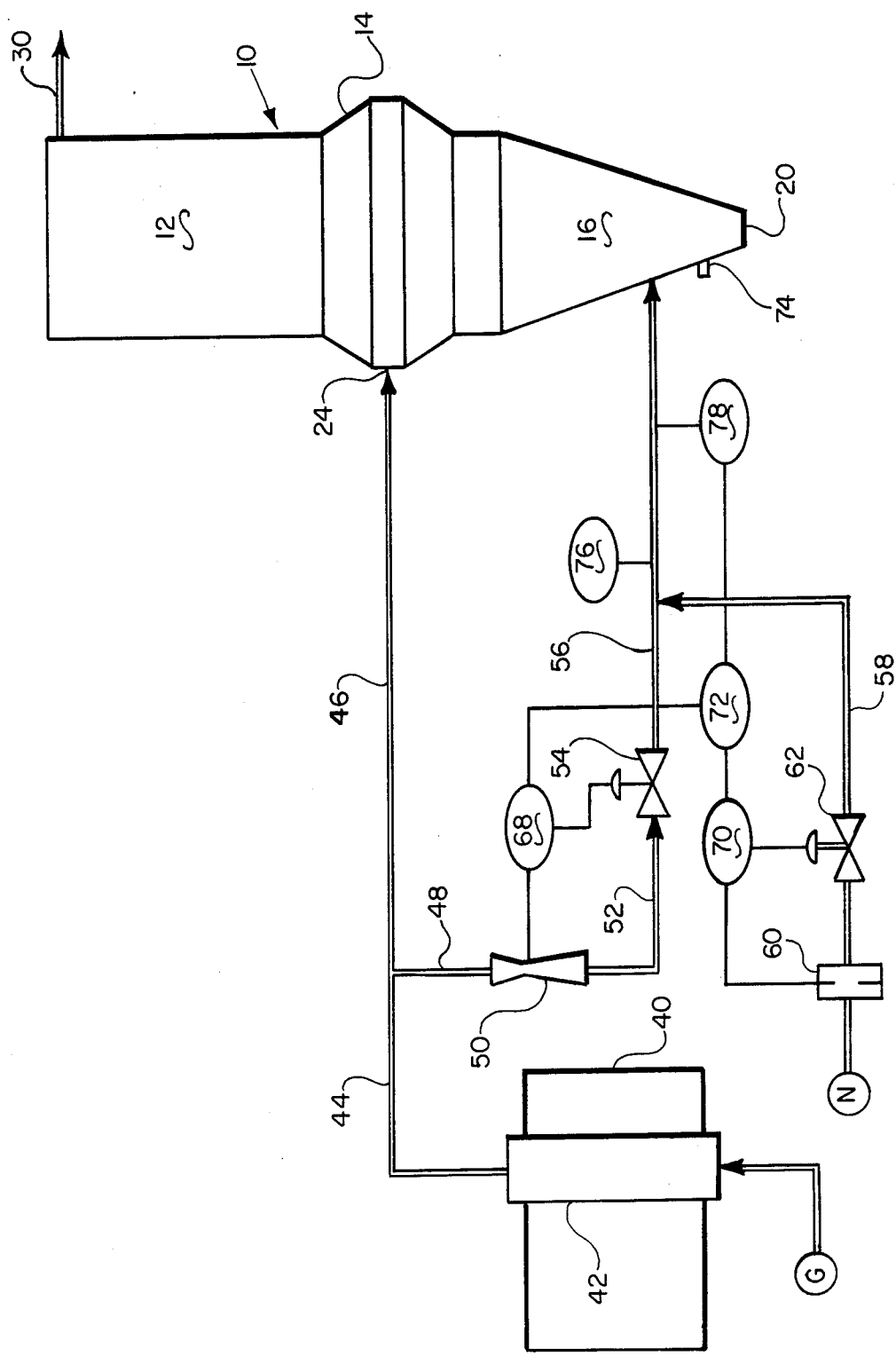

APPARATUS AND METHOD FOR INCREASING CARBON CONTENT OF HOT DIRECTLY REDUCED IRON

BACKGROUND OF THE INVENTION

This invention relates generally to the direct reduction of iron oxide materials to produce metallized iron in solid state such as hot metallized pellets or hot sponge iron in a direct reduction shaft furnace. "Metallized" as used throughout this specification and the appended claims means substantially reduced to the metallic state i.e. always in excess of 75% metal, and usually in excess of 85% metal in the product. Such metallized pellets or sponge iron are well suited as feed materials to steel making furnaces such as an electric arc furnace.

Clark et al, U.S. Pat. No. 4,054,444 teaches means for controlling the carbon content of direct reduced iron pellets when discharged cold from a direct reduction shaft furnace. The gas injected in the Clark et al patent is methane, natural gas, or heavy hydrocarbon gas, to which optionally can be added clean spent top gas from the direct reduction furnace. The gas is injected into the buffer zone, which is the zone between the reduction zone and cooling zone in the furnace. One of the functions of the Clark et al invention is to precool the burden before it reaches the cooling zone to reduce the required cooling within the cooling zone. The present invention requires the avoidance of this cooling effect.

Currently, there are three known methods for increasing the carbon content of direct reduced iron product, all of which are implemented in commercial operation. These three methods are:

(1) lowering the reducing gas temperature at the furnace bustle;
(2) increasing the methane or other hydrocarbon content of the reducing gas to the bustle by adding natural gas; and
(3) injecting natural gas into the lower, or discharge section, of the furnace.

Each of these methods increases the carbon content of the direct reduced iron product, but each method also has limitations in normal furnace operation.

Lowering the reducing (bustle) gas temperature has proven to increase the carbon content in the product in operating direct reduction plants around the world, however, the plant production (output) also suffers a reduction, due to slower reducing reactions. This loss of production capacity with lower reducing gas temperatures has been verified by plant operating history over many years.

Increasing the hydrocarbon content of the reducing gas by adding natural gas to enrich the reducing gas at the bustle has been tried to raise the carbon content of the product. The added hydrocarbon in the reducing gas cracks at high furnace temperatures, adding more carbon to the product.

The cracking of these hydrocarbons produces carbon which is integrated into the product, and hydrogen which flows upwardly through the shaft furnace where it acts as additional reductant gas for reducing the iron oxide to metallized iron (or direct reduced iron) in the upper reduction zone of the shaft furnace. The amount of hydrocarbon that can be added to the furnace is limited because the cracking of hydrocarbons is an endothermic reaction. An overabundance of hydrocarbons in the reducing gas, when cracked to form (C) plus hydrogen ($H_2$), causes a cooling trend in the shaft furnace. The resulting reduction in burden temperature causes a slower reduction reaction between the reducing gas and the iron oxide, and, ultimately, lower production. In addition, in a hot discharge/hot briquetting (HD/HB) direct reduction plant, the added cooling adversely affects the ability of the metallized iron product to be briquetted, a situation which must always be avoided.

Injection of natural gas into the lower cone (cooling and discharge) region of the shaft furnace is also a proven method of adding carbon to the product in direct reduction plants. In a cold product discharge plant, this is an excellent and economic method of adding carbon to the product. It is limited only by the amount of cooling that can be tolerated in the upper (reducing) section of the shaft furnace without significantly reducing the furnace output or product quality. The usual desired level of carbon addition to the product can be easily achieved without reaching the point of overcooling the burden, since it is desirable to discharge the product at near ambient temperatures. In HD/HB plants, an added product specification must be met in addition to production rate and product quality; the product must be sufficiently hot on discharge to be compacted into briquets. It is this product requirement that severely limits the amount of natural gas that can be injected into the lower portion of the hot discharge furnace. The endothermic reaction of cracking the natural gas can cool the burden below the minimum temperature for good briquetting. The three methods described above all have the same limitation of temperature. The reduction temperature in the furnace must be maintained above at least 760° C. if production is to be maintained. In the case of an HD/HB furnace operation, a high discharge temperature (above about 700° C.) must also be maintained to insure good briquetting. This final temperature requirement for hot discharge plants severely hinders the effectiveness of these three methods to deposit the desired amount of carbon in the product.

The problem is twofold: first, to add carbon to the product, and second, to avoid contributing any significant endothermic load to the furnace burden. The present invention overcomes both of these problems by making a controlled addition of hot reformed gas enriched with natural gas to the furnace discharge zone.

The accomplishment of both of these objectives rests in the fact that the reformed gas/natural gas mixture forms a "balanced" system, from a heat of reaction standpoint. The disadvantage to adding natural gas to the furnace is the endothermic cracking reactions that cause cooling within the furnace. In the reformed gas/natural gas mixture, there is a balancing reaction to the cracking reactions:

$$2CO\ (g) = C\ (s) + CO_2\ (g)$$

This is the Boudouard reaction. This reaction is possible because of the high CO content in the reformed gas. As the temperature begins to fall in the furnace because of the cooling effect from the cracking of the natural gas, the equilibrium of the Boudouard reaction favors carbon deposition to a greater extent. The deposition of carbon from the Boudouard reaction is an exothermic reaction. Therefore, by mixing the reformed gas and natural gas in the proper ratio, a balancing of the endothermic and exothermic heat loads in the furnace is realized. As the natural gas cools the burden by cracking, the CO restores the lost heat by decomposing to $CO_2$ and solid carbon.

The natural gas - reformed gas mixture is injected into the lower cone of the furnace at temperatures at or above the required minimum temperature to insure good briquetting. This inlet temperature is controlled by the amount of cold natural gas used to enrich the hot reformed gas. Since the reformed gas/natural gas mixture to the lower cone is hot, it provides an additional benefit during plant start-up.

The reformed gas/natural gas mixture provides more carbon than the enriched bustle gas method because of the lower temperature in the lower cone region of the furnace. Bustle gas temperatures are sufficiently high to crack the heavy hydrocarbons in the natural gas, but the temperature is too high for the Boudouard reaction to be carbon depositing. In the lower cone region, the temperatures are lower than bustle gas temperatures. They are cool enough that the Boudouard reaction favors carbon deposition, while still being warm enough to crack the hydrocarbons in the natural gas portion of the mixture. It is this slightly cooler environment in the lower cone region that makes this method better than simply enriching the bustle gas with natural gas. With these cooler temperatures there is a double carbon benefit not realized at bustle temperatures.

Finally, the hot reformed gas/natural gas mixture addition at a mixture ratio where furnace burden cooling does not occur will provide a hot upflowing gas to the reducing zone of the furnace. Whereas the addition of natural gas alone provides a cold gas that flows up the center of the reducing zone from the lower cone region, the reformed gas/natural gas mixture provides a much hotter gas to the furnace center.

In summary, by the invented method, a reformed gas/natural gas mixture added to or injected into the lower discharge region or cone of a direct reduction furnace provides as much or more carbon content in the product than natural gas alone. The mixture ratio is controlled to prevent burden cooling, and on startup, the process will speed up the burden heating and initial reduction phase. The invention provides the sought synergistic result; more carbon, no cooling.

OBJECTS OF THE INVENTION

It is the principal object of the present invention to provide a method and apparatus for producing a higher carbon content direct reduced iron product in a direct reduction furnace without adversely affecting overall furnace operation.

It is also an object of this invention to provide means for avoiding any significant endothermic reaction with the burden of a direct reduction furnace.

It is another object of the present invention to provide a method and apparatus for controlling a gas mixture for injection into a direct reduction furnace discharge zone which will not adversely affect furnace operation.

BRIEF DESCRIPTION OF THE DRAWING

The foregoing and other objects of the invention will become better understood by referring to the following detailed description and the appended drawing, in which:

The single figure is a schematic flowsheet showing the operation of and the apparatus of the subject invention.

DETAILED DESCRIPTION

As shown in the single figure, the invented process utilizes a vertical shaft-type reducing furnace 10 having an upper reducing zone 12 in the upper region of the furnace, a bustle gas introduction zone 14 in the central region of the furnace and a carbon control and product discharge region 16 in the bottom portion of the furnace. Iron oxide pellets or other materials such as lump ore are charged into the shaft furnace by gravity to form a bed of particulate iron oxide containing material, or burden, within the shaft furnace. Metallized, or reduced, material is removed from the furnace through outlet 20 at the bottom thereof. A bustle and tuyere system indicated generally at 24 surrounds the shaft furnace. Hot reducing gas is introduced to the reducing zone through gas ports within the bustle gas system. The hot reducing gas flows inwardly and upwardly through the reducing zone in counterflow relationship to the gravitational movement of the burden. The reducing gas reacts with the burden to form a top gas which exits the furnace through gas takeoff pipe 30 at the top of the furnace.

A reformer furnace 40 having fuel fired burners, not shown, and a plurality of indirect heat exchanger catalyst tubes 42, which are externally heated, only one of which is shown, generates hot reducing gas. The reducing gas flows from the catalyst-containing tubes 42 through reformed-gas pipe 44. A portion of the reformed gas passes through pipe 46 to bustle and tuyere system 24, a second portion of the reformed gas flows through pipe 48 to a hot venturi 50. Gas pipe 52 connects venturi 50 with valve 54, which is in turn connected to the lower cone portion 16 of the furnace by pipe 56.

Natural gas source N is connected to pipe 56 by natural pipe gas 58, which has a metering orifice 60 and flow control valve 62 therein.

The electrical controls for the process include a flow controller 68 which receives a signal from hot venturi 50 and controls valve 54, flow controller 70 which receives a signal from natural gas metering orifice 60 and sends a signal to valve 62. Both flow controllers 68 and 70 are connected to a ratio station 72, which is a computerized controller. Thermocouple 74, within the bottom of the shaft furnace may be connected to ratio controller 72, if desired, but is generally provided with an optical readout for use by the operator. Thermocouple 76 in pipe 56 on the shaft furnace side of the connection with pipe 58, which connection is the mixing point of the gases, can also be connected to ratio station 72. Gas analyzer 78, in pipe 56 near the shaft furnace, which is connected to ratio station 72, analyzes the methane composition of the gas in pipe 56.

In operation, process gas from source G, which can be spent top gas from shaft furnace off-take 30, natural gas, methane, or a mixture thereof, is reformed to substantially CO and $H_2$. The reformed gas is divided, part passing directly into the the bustle and tuyere system 24 as reducing gas, and a second portion being metered through hot venturi 50 which feeds a signal to flow controller 68 that activates hot valve 54 to maintain the flow at a specified setpoint. Natural gas from source N is fed into the system at ambient temperature, and metered through orifice 60. The metering orifice generates a signal to flow controller 70. The flow signal from the reformed gas hot venturi is transmitted from flow controller 68 to ratio station 72.

At ratio station 72, the setpoint for the natural gas flow controller 70 is computed and transmitted to controller 70 for implementation. By this control system, a fixed mixture ratio of reformed gas to natural gas is maintained. Gas analyzer 78 determines the methane (CH4) content of the gas mixture prior to its injection into the lower cone, and transmits this methane reading to ratio station 72 which adjusts the ratio of natural gas flow to reformed gas flow to give the desired methane content.

Thermocouple 74, located in the product discharge chamber 16 of the furnace 10, registers the temperature of the burden after it has passed the gas mixture injection point. If the temperature drops too much upon injection of the gas mixture, station 72 can either reduce the amount of natural gas in the mixture, or can reduce the flow rate of the mixture into the furnace. If the temperature in the discharge chamber 16 rises too high, the natural gas flow can be increased, or the flow rate of the gas mixture can be increased, either of which will bring the temperature down to the desired range. Station 72 determines which course should be followed, i.e., alter the mixture ratio or change the flow rate of the mixture, according to the mixture temperature as recorded by thermocouple 76. As the natural gas addition is reduced, this temperature approaches the hot reformed gas temperature, less the inherent heat losses through the piping. A sharp rise in the temperature as indicated by thermocouple 74 in the product discharge chamber could indicate too much CO reaction, in which case the natural gas flow should be increased to prevent localized overheating of the burden. The carbon content of the metallized iron pellet product is responsive to the hydrocarbon gas content of the mixture determined by mixing the constituents of the mixture in the proper ratio to balance the endothermic and exothermic reactions within the discharge section of the furnace.

SUMMARY OF THE ACHIEVEMENTS OF THE OBJECTS OF THE INVENTION

It is clear from the foregoing that the present invention overcomes the problem of cooling direct reduced iron by endothermically cracking methane or its equivalent to produce carbon, and by exothermically disassociating carbon monoxide to obtain carbon, thus balancing the exothermic and endothermic reactions within the discharge section of the shaft furnace.

What is claimed is:

1. In a vertical shaft-type reducing furnace having an upper reducing zone, an intermediate reducing zone and a lower carbon control and hot product discharge zone, means for introducing reducing gas intermediate the ends of the shaft furnace, means for removing metallized product from the bottom thereof, and means for removing reacted top gas from the top of the furnace, the improvement comprising:
   a reformer furnace, having a source of process gas communicating therewith and a hot reformed gas exit;
   a first conduit communicating between the hot gas exit of said reformer and the means for introducing reducing gas to the shaft furnace;
   a second conduit communicating with said first conduit and with the carbon control and product discharge zone of the shaft furnace;
   a source of natural gas;
   a third conduit communicating between said source of natural gas and said second conduit; and
   means for controlling the respective amounts of gas introduced to said product discharge zone from said reformer and said source of natural gas, and for maintaining the temperature within said product dishcarge zone at least 700° C.

2. Apparatus according to claim 1 wherein said second conduit includes a venturi and a first flow control valve therein, and means for adjusting said first valve in response to a signal generated by said venturi.

3. Apparatus according to claim 2 wherein said third conduit includes a metering orifice and a second flow control valve therein, and means for adjusting said second valve in response to a signal generated by said natural gas metering orifice.

4. Apparatus according to claim 3 wherein said means for adjusting said first valve and said second valve are flow controllers.

5. Apparatus according to claim 4 wherein said flow controllers are connected to a computer-controlled ratio station.

6. Apparatus according to claim 1 further comprising a thermocouple within said product discharge section of said shaft furnace between the elevation of said second conduit and said product discharge means.

7. Apparatus according to claim 1 further comprising means in said second conduit for analyzing the gas contained therein.

8. Apparatus according to claim 1 further comprising means for determining and reporting the gas temperature immediately downstream of the intersection of said second conduit and said third conduit.

9. A method for controlling the carbon content of hot metallized iron pellets produced by counter-current flow of hot reducing gases through a downwardly moving iron oxide burden in a substantially vertical shaft furnace, said furnace having an upper reducing zone, and a lower product discharge zone, said method comprising:
   introducing particulate iron oxide to the interior of said furnace to establish a burden therein;
   removing a portion of said burden from the bottom of said product discharge zone to establish a gravitional descent of said burden;
   introducing hot reducing gas into said reducing zone to react with said descending burden and form a reacted top gas;
   removing reacted top gas from the top of the reducing zone to establish countercurrent flow of reducing gas through said downwardly moving burden;
   introducing at a temperature of at least 700° C. a hydrocarbon gas mixture of hot reformed reducing gas and cool natural gas to the product discharge section of said shaft furnace; whereby the carbon content of said metallized iron pellet product is controlled by varying the hydrocarbon gas input conditions to the furnace, and cooling of said product is avoided.

10. A method according to claim 9 wherein said hot reducing gas is a methane-containing catalytically reformed gas.

11. A method of producing a hot, carburized metallized iron product in a generally vertical shaft furnace having an upper reducing zone in which iron oxide reacts with a gaseous reductant, and a lower carbon control and product discharge zone, said method comprising:

introducing particulate iron oxide to the interior of said furnace to establish a burden therein;

removing a portion of said burden from said discharge zone to establish gravitational descent of said burden;

introducing a hot gaseous reductant to said descending burden in said reducing zone to react with said burden to form a metallized iron product and a reacted top gas;

removing said reacted top gas from the top of said furnace to establish countercurrent flow of said reducing gas through said descending burden;

injecting a hydrocarbon gas mixture consisting of hot reformed reducing gas and cool natural gas to the product discharge section of said shaft furnace; whereby the carbon content of said metallized iron pellet product is controlled by mixing the reformed gas and natural gas in the proper ratio to balance the endothermic and exothermic reactions within the discharge zone of the furnace.

12. A method according to claim 11 wherein said hot reducing gas is a methane-containing catalytically reformed gas.

* * * * *